United States Patent [19]
Terai

[11] Patent Number: 5,275,370
[45] Date of Patent: Jan. 4, 1994

[54] SEAT SLIDE DEVICE WITH POSITION ADJUSTER

[75] Inventor: Masanori Terai, Ayase, Japan

[73] Assignee: Ikeda Bussan Co., Ltd., Ayase, Japan

[21] Appl. No.: 904,282

[22] Filed: Jun. 25, 1992

[30] Foreign Application Priority Data

Jun. 28, 1991 [JP] Japan .................. 3-049832[U]

[51] Int. Cl.⁵ .......................................... F16M 13/00
[52] U.S. Cl. ..................................... 248/429; 296/65.1
[58] Field of Search .............. 248/420, 424, 429, 430; 296/65.1

[56] References Cited

U.S. PATENT DOCUMENTS

| | | | |
|---|---|---|---|
| 4,109,973 | 8/1978 | Terada | 248/430 X |
| 4,635,890 | 1/1987 | Matsuda et al. | 248/429 |
| 4,889,379 | 12/1989 | Aso | 248/430 X |
| 4,949,932 | 8/1990 | Terai | 248/430 |
| 4,957,267 | 9/1990 | Terai | 248/430 |
| 4,961,559 | 10/1990 | Raymor | 248/429 |
| 4,964,608 | 10/1990 | Rogala et al. | 248/429 |
| 5,082,228 | 1/1992 | Shimazaki | 248/430 |

FOREIGN PATENT DOCUMENTS 0317389 5/1989 European Pat. Off.
2423969 12/1974 Fed. Rep. of Germany.
1546166 5/1979 United Kingdom.

Primary Examiner—Ramon O. Ramirez
Attorney, Agent, or Firm—Foley & Lardner

[57] ABSTRACT

A first rail unit is mounted on a higher mounting portion of a vehicle floor, and a second rail unit is mounted on a lower mounting portion. Each rail unit is equipped with a lock mechanism by which a movable upper rail is locked to a stationary lower rail. A generally U-shaped control lever is employed for releasing locked condition of the lock mechanisms of the two rail units. One end of the control lever is directly connected to the lock mechanism of the first rail unit and the other end of the control lever is connected through a link mechanism to the lock mechanism of the second rail unit. Thus, the first and second rail units can be intimately or stably mounted to the higher and lower mounting portions respectively.

7 Claims, 4 Drawing Sheets

SEAT SLIDE DEVICE WITH POSITION ADJUSTER

BACKGROUND OF THE INVENTION

1. Field of the Invention

The present invention relates in general to seat slide devices for use in motor vehicles or the like, and more particularly to seat slide devices of a type having a position adjuster by which a fore-and-aft position of the associated seat can be adjusted. More specifically, the present invention are concerned with seat slide devices of a type which is constructed to be mounted on a stepped floor.

2. Description of the Prior Art

In order to clarify the task of the present invention, one conventional seat slide device 100 of the above-mentioned type will be described with reference to FIGS. 5 and 6 of the accompanying drawings.

The device 100 comprises a pair of parallel rail units 1a and 1b which are tightly mounted on a stepped floor 200 of a motor vehicle. That is, one rail unit 1a is mounted to a higher mounting portion 200a of the floor 200, while the other rail unit 1b is mounted through supporting brackets 4 to a lower mounting portion 200b of the floor 200. Due to usage of the supporting brackets 4, the two rail units 1a and 1b are kept leveled with each other.

Each rail unit 1a or 1b comprises a stationary lower rail 3 which is connected in a stationary manner movable to the floor 200, and a upper rail 2 which is slidably engaged with the lower rail 3 and which has mounted thereon on a seat 300 (see FIG. 6).

Each rail unit 1a or 1b also has a lock device 5 by which the upper rail 2 can be locked to the lower rail 3 at a desired fore-and-aft position. The lock device 5 comprises a locking member 5a which is pivotally held by the upper rail 2 and lockingly engageable with notches formed in the lower rail 3.

The locking members 5a of these two lock devices 5 are secured to respective ends of a generally U-shaped control lever 6 which protrudes forward. Although not shown in the drawings, a spring is associated with each locking member 5a to bias the same in a direction to achieve a locked engagement with the notches of the lower rail 3. Usually, that is, when the control lever 6 is kept released, each locking member 5a is in locked engagement with the notches of the lower rail 3 causing the seat 300 to be locked at a desired fore-and-aft position. However, when the control lever 6 is pulled against the biasing force of the springs, each locking member 5a is disengaged from the notches of the lower rail 3. Thus, when the control lever 6 is kept pulled against the biasing force, the seat 300 is permitted to move forward or rearward to a new fore-and-aft position. The seat slide device of this type is disclosed in U.S. Pat. No. 4,949,932 granted Aug. 21, 1990 to Masanori Terai.

However, due to its inherent construction, the above-mentioned conventional seat slide device 100 hay,the following drawbacks.

That is, the provision of the supporting brackets 4a and 4b for raising the position of the rail unit 1b tends to cause an unstable arrangement of the seat slide device 100 with respect to the stepped floor 200. In fact, due to usage of the supporting brackets 4a and 4b, the stability of the rail unit 1b is poor in comparison with the other rail unit 1a which is intimately or stably secured to the floor 200. Furthermore, usage of the brackets 4a and 4b which are large in size, increases the weight of the vehicle on which the seat slide device 100 is mounted.

SUMMARY OF THE INVENTION

It is therefore an object of the present invention to provide a seat slide device which is free of the above-mentioned drawbacks.

According to the present invention, there is provided a seat slide device which can be stably mounted to a stepped floor without using such large-sized brackets of the conventional device.

According to the present invention, there is provided an improved seat slide device for use in a stepped floor. The seat slide device comprises first and second rail units which are adapted to be respectively mounted on higher and lower mounting portions of the stepped floor, each rail unit including a stationary lower rail secured to the floor and a movable upper rail slidably engaged with the lower rail; and first and second lock mechanisms respectively associated with the first and second rail units for locking each upper rail at a desired position relative to the corresponding lower rail, each lock mechanism including means for defining notches in the lower rail, a locking lever pivotally connected to the upper rail, a pawl portion defined by the locking lever and latchingly engageable with the notches, and biasing means for biasing the locking lever in a direction to achieve the latched engagement between the pawl portion and the notches; a control lever having a first end directly connected to the locking lever possessed by the first lock mechanism and a second end pivotally connected to a raised part of the upper rail possessed by the second rail unit; and a link mechanism transmitting motion of the second end of the control lever to the locking member possessed by the second lock mechanism.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
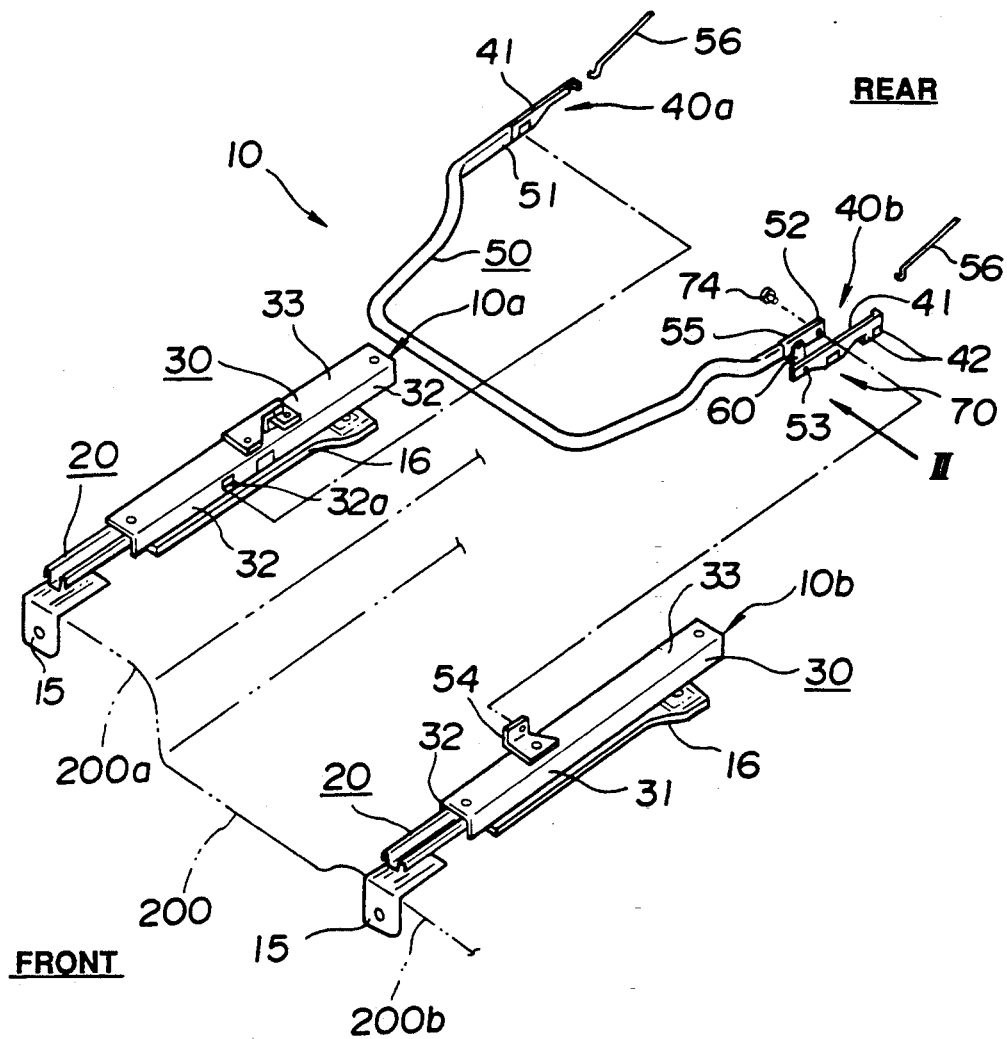
FIG. 1 is a perspective view of a seat slide device of the present invention, with a control lever dismounted.

Referring to FIGS. 1 to 4, particularly FIG. 1, there is shown a seat slide device 10 according to the present invention.

As is shown in FIG. 1, the seat slide device 10 of the invention comprises generally two, viz., right and left parallel rail units 10a and 10b which are mounted intimately to higher and lower mounting portions 200a and 200b of a stepped floor 200 of a motor vehicle.

Since the two rail units 10a and 10b are similar in construction, the following description on them will be directed to only the right rail unit 10a for facilitation of description.

Figure 4:
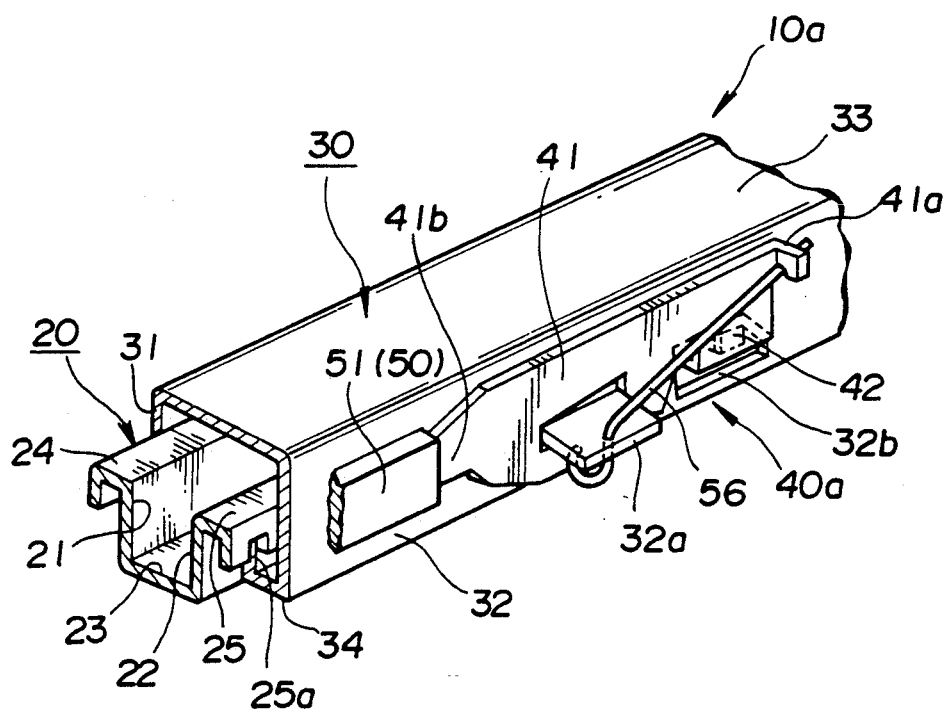
FIG. 4 is a perspective view of one of the rail units employed in the seat slide device of the present invention.
Figure 5:
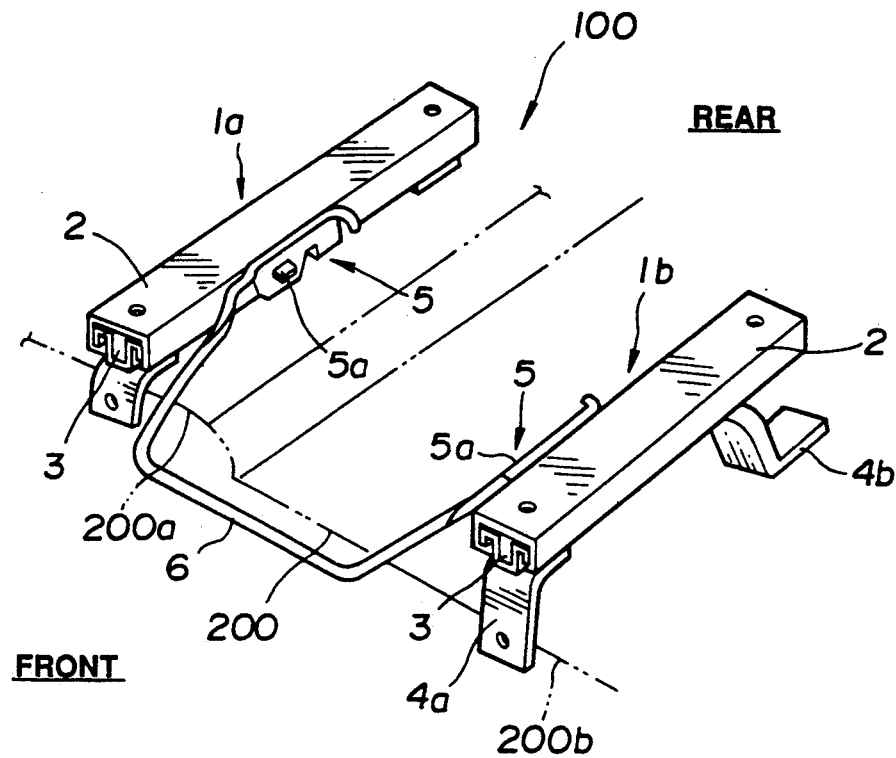
FIG. 5 is a perspective view of a conventional seat slide device.
Figure 6:
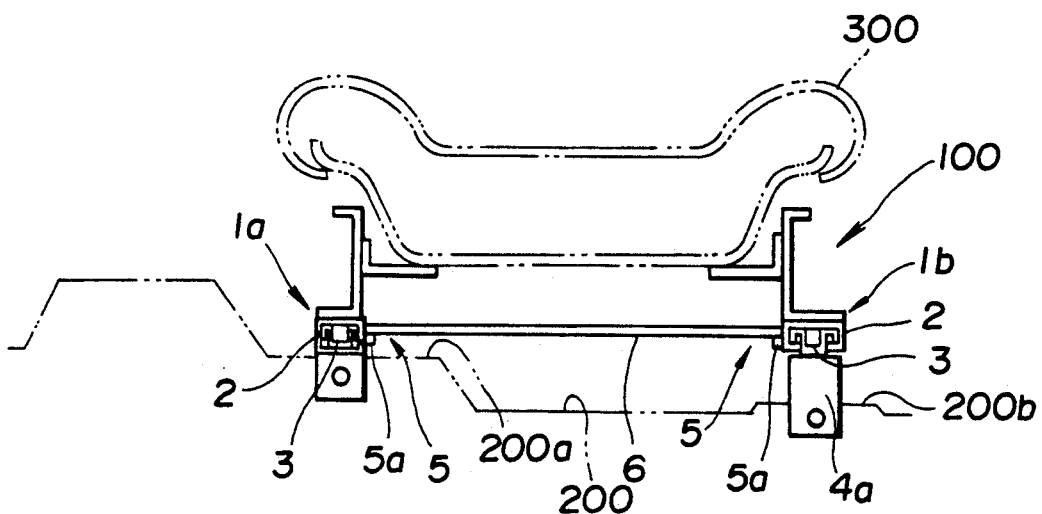
FIG. 6 is a front view of the conventional seat slide device.

As will be seen from FIGS. 4 and 1, the rail unit 10a comprises a stationary lower rail 20 which is connected through front and rear brackets 15 and 16 to the higher mounting portion 200a of the stepped floor 200, and a movable upper rail 30 which is a slidably disposed on the lower rail 20 and has mounted thereon a seat (not shown). As will become apparent as the description proceeds, the upper rail 30 is constructed to cover the lower rail 20. As is seen FIG. 4, the lower rail 20 comprises an elongate bottom wall 23, side walls 21 and 22 extending upward from lateral ends of the elongate bottom wall 23, and flanges 24 and 25 extending outward from upper ends of the respective side walls 21 and 22. Each flange 24 or 25 has at an outward end a downwardly extending portion. The downwardly extending portion of the flange 25 is formed with longitudinally aligned notches 25a.

As is seen from FIG. 4, the upper rail 30 comprises an elongate upper wall 33, side walls 31 and 32 extending downward from lateral ends of the elongate upper wall 33, and flanges 34 (only one is shown) extending inward from lower ends of the respective side walls 31 and 32. Each flange 34 has at an inward end an upwardly extending portion.

As is understood from FIG. 4, upon assembly of the upper and lower rails 30 and 20, the respective inward flanges 34 of the upper rail 30 are slidably interlocked with the outward flanges 24 and 25 of the lower rail 20.

Although not shown in the drawings, rollers are disposed between the lower rail 20 and the upper rail 30 to smooth the longitudinal movement of the upper rail 30 relative to the lower rail 20. Designated by numeral 40a in FIG. 4 is a lock device which comprises a locking lever 41 pivotally connected to the side wall 32 of the upper rail 30 through a supporting lug 32a. The locking lever 41 has an inwardly bent pawl portion 42 which gets into an opening 32b formed in the side wall 32 for engagement with the notches 25a of the lower rail 20. A bar spring 56 extends between the supporting lug 32a and a projection 41a of the locking lever 41 in order to bias the locking lever 41 in a direction to achieve the engagement of the pawl portion 42 and the notches 25a. The locking lever 41 has a reduced front end 41b for the purpose which will be described hereinafter.

It is now to be noted that the left rail unit 10b (see FIG. 1) has substantially the same construction as that of the above-mentioned right rail unit 10a except things caused by a symmetrical relationship therebetween.

As is seen from FIG. 1, for synchronously manipulating the locking levers 41 of the right and left rail units 10a and 10b, a generally U-shaped control lever 50 is employed. Furthermore, in the present invention, a link mechanism 70 is further employed for dealing with the difference in height between the right and left rail units 10a and 10b.

Figure 2:
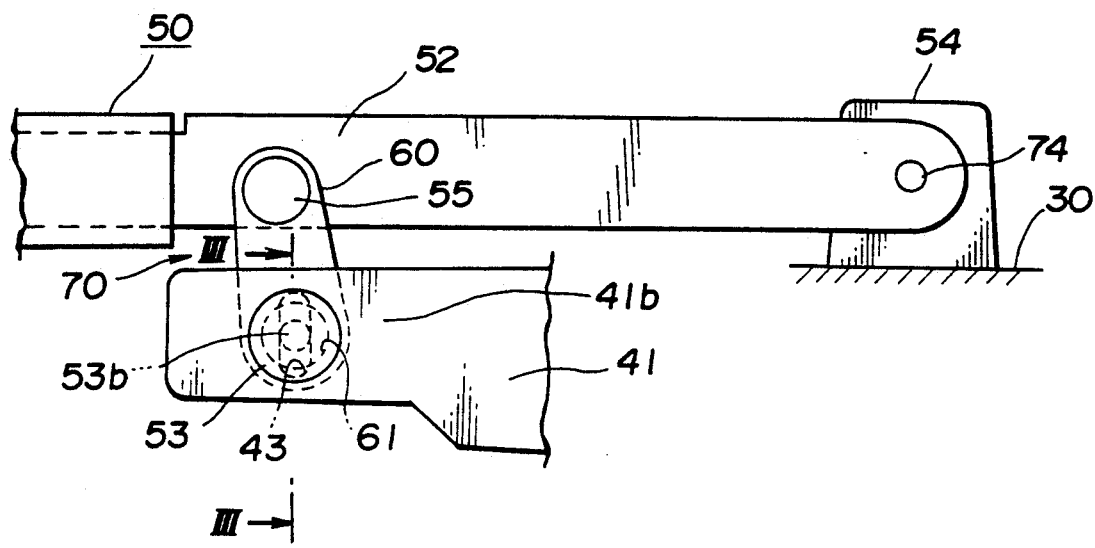
FIG. 2 is an enlarged side view of an essential part of the seat slide device of the present invention, which view is taken from the direction of the arrow II of FIG. 1.
Figure 3:
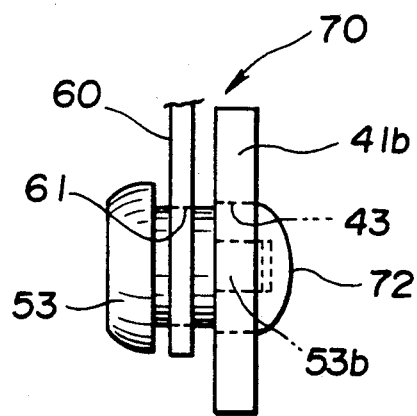
FIG. 3 is a sectional view taken along the line III—III of FIG. 2.

That is, as is seen from FIG. 4, a right end 51 of the U-shaped control lever 50 is directly connected to the front end 41b of the locking ever 41 of the right rail unit 10a, while, as is seen from FIGS. 1 and 2, a left end portion 52 of the control lever 50 is connected to the front end 41b of the locking lever 41 of the left rail unit 10b through the link mechanism 70.

As is best seen from FIG. 2, the link mechanism 70 comprises a link 60 which has an upper end pivotally connected through a pivot pin 55 to the left end portion 52 of the U-shaped control lever 50. As is seen from FIGS. 2 and 3, a lower end of the link 60 has an opening 61 through which a rivet 53 passes. The rivet 53 has a reduced end 53b which is slidably received in an elongate slot 43 formed in the front end 41b of the locking lever 41. A nut 72 is fixed to the reduced end 53b of the rivet 53 for holding the rivet 53 in place. Thus, a so-called lost motion is carried out between the left end 52 of the lever 50 and the front end 41b of the locking lever 41.

As is seen from FIG. 1, the left end 52 of the U-shaped control lever 50 is pivotally connected through a pin 74 to a bracket 54 which is secured to the upper rail 30 of the left rail unit 10b. The bracket 54 of the left rail unit 10b is so sized as to level the pin 74 with the supporting lug 32a of the right rail unit 10a.

In the following paragraphs, the operation of the seat slide device 10 will be described.

For ease of understanding, the description will be commenced with respect to a locked condition of the seat slide device 10. Under this condition, due to the biasing force of the bar springs 56, the pawl portion 42 of each lock device 40a or 40b is in latched engagement with selected ones of the notches 25a of the lower rail 20 and the U-shaped control lever 50 assumes its lower position. Thus, the seat on the rail units 10a and 10b is locked at a certain position relative to the floor 200.

When the U-shaped control lever 50 is pulled upward, the same is pivoted upward against the force of the bar springs 56 about an axis which connects the supporting lug 32a of the right rail unit 10a and the pin 74 of the left rail unit 10b. With this, the pawl portion 42 of the locking lever 41 associated with the right rail unit 10a is disengaged from the notches 25a of the right lower rail 20.

At the same time, the pawl portion 42 of the locking lever 41 associated with the left rail unit 10b is disengaged from the notches 25a of the left lower rail 20. That is, as is seen from FIG. 2, when the control lever 50 is pivoted upward about the pin 74, the link 60 draws up the front end 41b of the locking lever 41 causing disengagement of the pawl portion 42 from the notches 25a of the left lower rail 20.

Thus, when the U-shaped control lever 50 is kept pulled upward, the seat on the upper rails 30 is permitted to slide freely forward or rearward relative to the floor 200 (viz., the lower rails 20).

When, upon the seat coming to a new position, the control lever 50 is released from the operator's hand, the lever 50 is pivoted down due to the biasing force of the bar springs 56 and thus the pawl portions 42 of the two locking levers 41 are brought into engagement with the respective notches 25a of the right and left lower rails 20. Thus, the seat is locked at the new position.

As will be understood from the foregoing description, in the present invention; the provision of the link mechanism 70 enables the two rail units 10a and 10b to be intimately or stably mounted to the higher and lower mounting portions 200a and 200b of the stepped floor 200. Because there is no need of using large supporting brackets for raising the position of the left rail unit 10b, an undesired weight increase of the associated motor vehicle is not induced.

What is claimed is:

1. A seat slide device for use in a stepped floor, comprising:

first and second rail units which are adapted to be respectively mounted on higher and lower mounting portions of said stepped floor, each rail unit including a stationary lower rail secured to the floor and a movable upper rail slidably engaged with the lower rail; and first and second lock mechanisms respectively associated with said first and second rails units for locking each upper rail at a desired position relative to the corresponding lower rail, each lock mechanism including means for defining notches in the lower rail, a locking lever pivotally connected to the upper rail, a pawl portion defined by said locking lever and latchingly engagable with said notches, and biasing means for biasing said locking lever in a direction to achieve the latched engagement between said pawl portion and said notches;

a control lever having a first end directly connected to the locking lever of said first lock mechanism and a second end pivotally connected to a raised part of the upper rail of said second rail unit; and a link mechanism for transmitting motion of said second end of said control lever to the locking member of said second lock mechanism, said link mechanism including a link having one end pivotally connected to said second end of said control lever; and lost motion means for connecting the other end of said link with one end of said locking lever in a manner to allow a lost motion therebetween.

2. A seat slide device as claimed in claim 1, in which the upper rail of each rail unit is formed with an opening through which said pawl portion of said locking lever passes to engage with said notches.

3. A seat slide device as claimed in claim 1, in which said one end of said locking lever is positioned opposite to said pawl portion with respect to the pivot about which said locking lever pivots.

4. A seat slide device as claimed in claim 3, in which said lost motion means comprises:

means defining an opening in the other end of said link;

a rivet loosely passing through said opening, said rivet having a reduced end; and means defining in said one end of said locking lever an elongate slot in which the reduced end of said rivet is slidably received.

5. A seat slide device as claimed in claim 4, in which said lost motion means further comprises a nut which is fixed to the reduced end of said rivet for holding said rivet in place.

6. A seat slide device as claimed in claim 1, in which said raised portion of the upper rail possessed by said second rail unit is a separate bracket which is secured to the upper rail.

7. A seat slide device as claimed in claim 6, in which said control lever is generally U-shaped and arranged with its middle portion projected in a forward direction with respect to a seat which is adapted to be mounted on said rail units.

* * * * *